US008844115B2

(12) United States Patent
Lindner et al.

(10) Patent No.: US 8,844,115 B2
(45) Date of Patent: Sep. 30, 2014

(54) PRODUCTION METHOD FOR A SHREDDING DEVICE

(75) Inventors: Manuel Lindner, Spittal/Drau (AT); Peter Schiffer, Millstatt (AT); Mario Fritz, Millstatt (AT)

(73) Assignee: Manuel Lindner, Spittal/Drau (AT)

( * ) Notice: Subject to any disclaimer, the term of this patent is extended or adjusted under 35 U.S.C. 154(b) by 415 days.

(21) Appl. No.: 13/154,072

(22) Filed: Jun. 6, 2011

(65) Prior Publication Data

US 2011/0308064 A1 Dec. 22, 2011

(30) Foreign Application Priority Data

Jun. 17, 2010 (EP) .................................... 10006327

(51) Int. Cl.
*B23P 19/00* (2006.01)
*B02C 18/16* (2006.01)
*B02C 18/00* (2006.01)

(52) U.S. Cl.
CPC ................. *B02C 18/00* (2013.01); *B02C 18/16* (2013.01); *B02C 2018/162* (2013.01); *B02C 2201/06* (2013.01)
USPC ....................................................... 29/525.11

(58) Field of Classification Search
USPC ............... 29/525.11, 525.13, 525.14, 525.06, 29/525.02, 525.01, 524.1, 505, 428
See application file for complete search history.

(56) References Cited

U.S. PATENT DOCUMENTS 1,713,507 A 5/1929 Ammon
2006/0143921 A1 * 7/2006 Altenburg et al. ........... 29/897.2

FOREIGN PATENT DOCUMENTS

DE 102005030876 * 1/2007
GB 2116875 A 10/1983

* cited by examiner

*Primary Examiner* — John C Hong
(74) *Attorney, Agent, or Firm* — IP Strategies

(57) ABSTRACT

A method for producing a machine casing of a shredding device includes providing component parts and/or assembly groups of the machine casing of the shredding device. Retaining ring bolts are provided, and at least some of the component parts and/or assembly groups of the machine casing are connected to each other through use of the retaining bolt rings.

12 Claims, 3 Drawing Sheets

PRODUCTION METHOD FOR A SHREDDING DEVICE

FIELD OF THE INVENTION

The present invention relates to a production method for a shredding device for shredding material in the form of waste products.

BACKGROUND OF THE INVENTION

Commercial waste, industrial waste, domestic waste etc., e. g. (hard) plastics, textiles, composites, rubber or waste wood (such as pallets and chipboards) need to be shredded before their ultimate disposal or particularly before they are recycled. For the shredding above all single-shaft or multi-shaft shredders are known from the prior art, which are charged with material, for instance, by wheel loaders, fork trucks or conveyor belts via a hopper A conventional shredder comprises a rotor unit including a rotor, which is equipped with severing hooks or cutting blades, which may be provided, for instance, with concavely ground circular cutting crowns. The cutting blades are, for instance, screwed to cutting blade holders, which may be welded into or, for instance, be screwed to cutting blade pockets, which are milled into the rotor. The shredding of the charged material is accomplished between the cutting blades rotating with the rotor and stationary, i.e. non-rotating counter blades (stator blades, wiper elements). Typically, the rotor unit is driven outside the machine casing of the shredder into which the rotor unit is fitted.

Moreover, a conventional shredder may comprise a pushing device, by means of which the charged material is pushed in the direction of the rotating rotor. After the shredding between the rotating cutting blades and the counter blades the material is discharged by a screening device, which determines the shredding factor according to the screen size, and is transported further by means of a conveyor belt, a screw conveyor, a chain conveyor or a suction apparatus etc.

Examples for industrial shredders are the primary shredder JUPITER of the company Lindner Recyclingtech, which is a slowly operated single-shaft shredder mainly used for pre-shredding materials such as household refuse, commercial and industrial waste, the secondary shredder KOMET of the company Lindner Recylingtech, which is a single-shaft shredder particularly used for the secondary size reduction/granulation of pre-shredded material free from foreign particles, e.g. paper, cardboard packagings, plastic and foam materials, and the slowly operated single-shaft shredders UNIVERSO, MICROMAT and VEGA of the company Lindner Recyclingtech.

The machine casings of conventional shredders serve to accommodate the attachments and built-in components, like those of the cutting blade rotor and the drive components. During their operation they are subjected to great loads, especially in the form of vibrations. Therefore, the machine casings are provided in the form of welded casings. However, the required large-surface welding assembly groups involve the problem caused by a welding distortion, which renders the maintenance of dimensional tolerances difficult and may result in mechanical weak points. The effort for minimizing the welding distortion and for a correspondingly necessary post-processing is great. Therefore, it is the object to provide an alternative production method for a machine casing for a shredder that does not involve the welding distortion problem.

BRIEF SUMMARY OF THE INVENTION

The above object is achieved with the method for producing a machine casing for a shredder according to claim 1. The method comprises the steps of:

providing component parts and/or assembly groups of the machine casing of the shredding device;

providing screws or bolts; and connecting at least some of the component parts and/or assembly groups of the machine casing to each other by means of the screws or bolts.

The shredding device, for the machine casing of which a production method is provided, is particularly designed for the shredding of untreated household refuse, commercial and industrial waste, bulky waste, waste wood and mixed construction site waste, or for the secondary shredding/granulation of pre-shredded material such as commercial waste for the thermal exploitation or recycling of valuable substances, e.g. paper, cardboard, plastic or foam materials, rubber, leather, textiles, floor coverings, cables, computer scrap etc. The shredding devices have a weight of more than 1000 kg, specifically a weight of approximately 10000 to approximately 40000 kg. The shredding device, for which the machine casing is produced according to the inventive method, may be a single-shaft shredder, specifically a single-shaft coarse shredder, or a multi-shaft shredder.

Therefore, instead of welding the component parts and/or assembly groups together, as is well known from the prior art, component parts and/or assembly groups suitable in terms of production engineering are fixedly connected to each other by means of screws or bolts (rivets). Connecting at least a part of the component parts and/or assembly groups by means of screws or bolts (rivets) overcomes the aforementioned problem caused by the welding distortion of the so connected component parts and/or assembly groups. It will be appreciated that the component parts and/or assembly groups connected to each other by means of screws or bolts (rivets) may themselves include welded components. It will also be appreciated that certain ones of the component parts and/or assembly groups can be welded together. In general, the used bolts may comprise a bolt head and a threaded journal. They may be made of a material that is used for the production of high-strength screwed connections, e.g. of 19 Mn B 4, 35 B2 or 30 Cr 4.

Each of the bolts may be provided in the form of a retaining ring bolt, which may particularly be provided with helical securing grooves, which hold the retaining ring bolt and a retaining ring provided on the retaining ring bolt in position prior to fitting the retaining ring bolt. Due to the retaining ring well-defined strength values for the fixing bolts may be reached automatically. Such retaining ring bolts have the particular advantage that they do not get loose even if strong vibrations to be expected when used in shredding devices occur. The retaining ring bolt can be made, for instance, of alloyed carbon with a zinc-plated retaining ring.

Thus, the invention provided overcomes a technical prejudice according to which only welding is possible for a production method for a machine casing for a shredder of the above-mentioned type. This prejudice has been so striking in the prior art that the person skilled in the art would not even consider carrying out alternative production tests in order to find out whether these are practicable alternatives to the previously know possibility of a production based consistently on welding The smaller the individual welding groups of the component parts and/or assembly groups are, the smaller is the total effort with respect to the welding distortion. Moreover, the component parts and/or assembly groups, which, for the production, are connected to each other by means of screws or bolts (rivets), can be easily held available so that short delivery periods are obtained without the necessity for a large stock of already produced machine casings. Component parts and/or assembly groups can be held available in different sizes, which provides for the easily and fast realizable possibility to produce and supply a plurality of different variations of machine casings and, thus, shredders.

Also, by the connection with screws or bolts (rivets) the number of welding seams, specifically greatly stressed welding seams, can be reduced. As the quality of welding seams is subject to quality fluctuations due to the processing by corresponding staff, the connection by screws or bolts in a semi-automatic production (automatic fixing by pre-mounting) ensures a constant quality, the reliability of the machine casing, which is greatly stressed during the operation, can be significantly increased as compared with the prior art. Specifically, for the connection with screws or bolts, they can be tightened by means of torque wrenches, e.g. electronic or mechatronic torque wrenches, so as to exert a well-defined tightening force. Moreover, hydraulic mounting equipment may be used for the connection with bolts (rivets).

Other features and exemplary embodiments of the present invention shall be explained in more detail below by means of the drawing. It will be appreciated that the embodiments do not limit the scope of the present invention. It will also be appreciated that some or all of the features described below may also be combined with each other in a different manner.

DETAILED DESCRIPTION OF THE INVENTION

Figure 1:
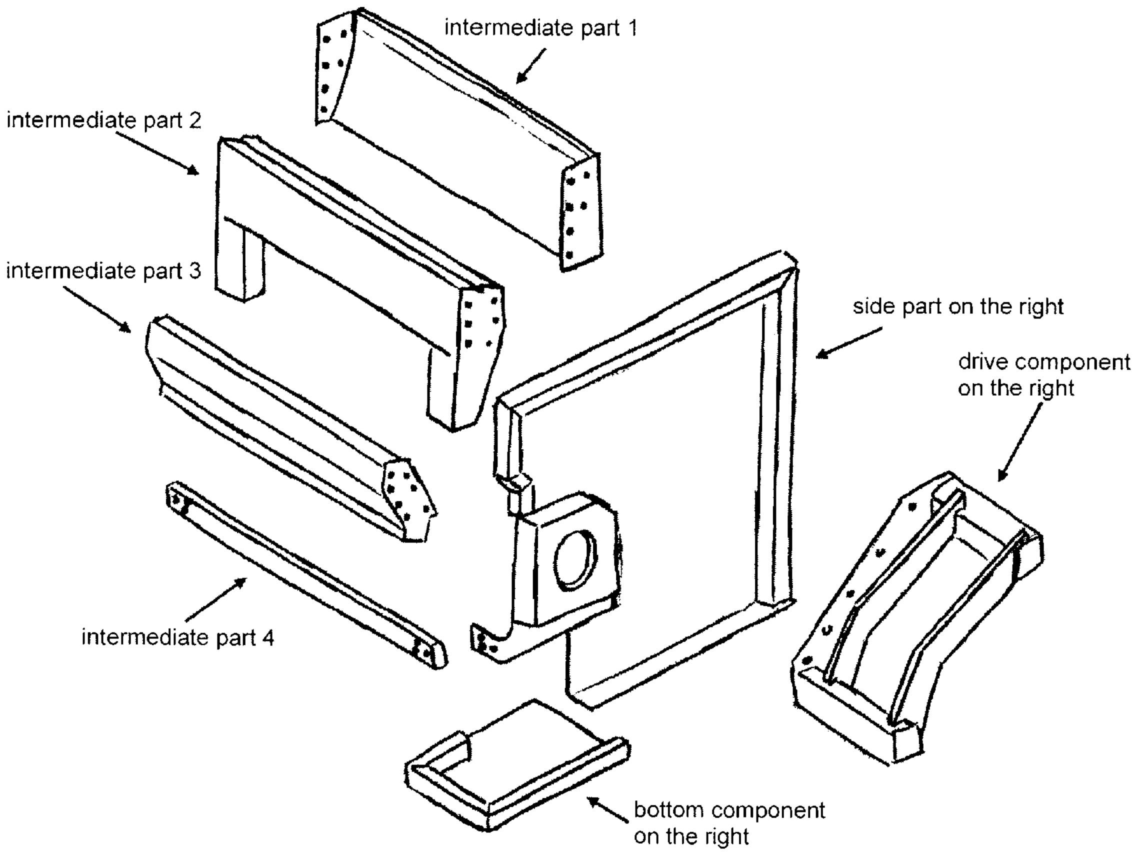
FIG. 1 represents an example for production methods for a machine casing of a shredding device according to the present invention, in which component parts and/or assembly groups of the machine casing are connected to each other by means of bolts.

As shown in FIG. 1, a machine casing of a shredding device (see top of illustration) comprises several intermediate parts 1 to 4, a bottom component, a side part and a drive component. These parts and components are welded together in a conventional machine casing of a conventional shredding device.

However, according to the invention these parts and components are not welded together, but they are connected to each other by means of screws or bolts (rivets).

For this connection, for instance, bolts are used, which are made of a material that is used for the production of high-strength screwed connections, e.g. 19 Mn B 4, 35 B2 or 30 Cr 4. Specifically, retaining ring bolts made of alloyed carbon with a zinc-plated retaining ring may be used. Such a bolt may be inserted into a correspondingly prepared bore hole, whereupon a retaining ring is rotated onto the bolt. A fixing tool is fitted to annular tension grooves of the bolt and is operated, whereupon draw-in attachments of the tool partially draw the bolt into the tool and a deformation sleeve presses the retaining ring against the connection. Thus, an initial clamping force is applied. Then, the tool compresses the retaining ring so that the clamping force is increased. Finally, after the retaining ring was compressed, the tool is released again.

Figure 2:
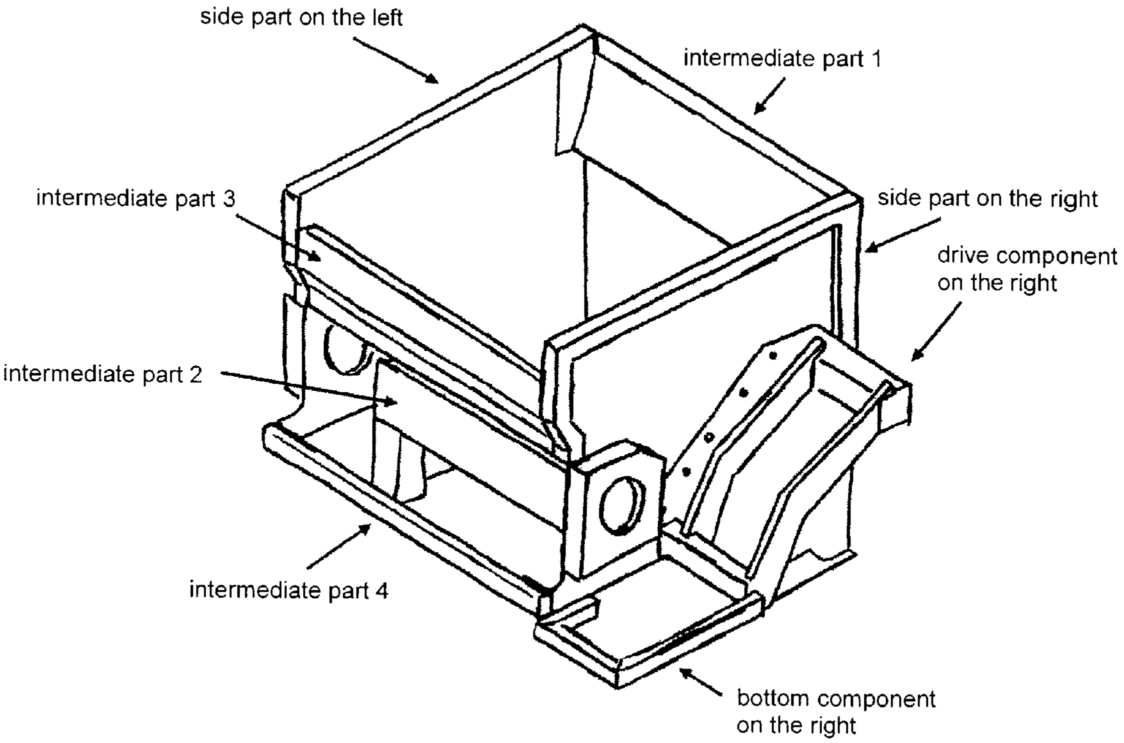
FIG. 2 shows a machine casing of a shredding device according to the present invention, in which component parts and/or assembly groups of the machine casing are connected to each other by means of screws or (retaining ring) bolts.

Thus, the machine casing shown in FIG. 2 can be manufactured from the component parts and/or assembly groups illustrated in FIG. 1 by connecting the same by means of screws or (retraining ring) bolts.

Figure 3:
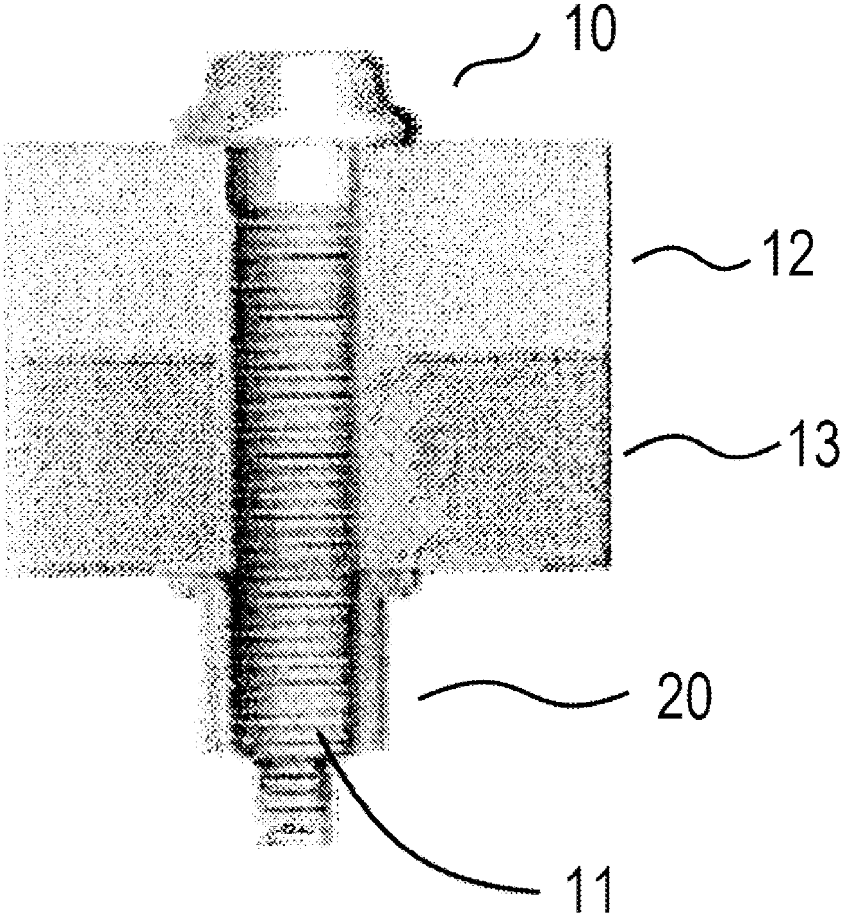
FIG. 3 shows an exemplary retaining bolt according to the invention.

A retaining bolt 10 is illustrated in FIG. 3. The retaining bolt 10 comprises helical securing grooves 11. Elements 12 and 13 are connected to each other by means of the retaining ring bolt 10 and a retaining ring 20.

It will be appreciated that the method according to the invention includes the production of machine casings for both single-shaft and multi-shaft shredders and specifically of vertical shredders. The method according to the invention also includes the production of machine casings for single-shaft coarse shredders, which may preferably be used for the preliminary shredding of unsorted materials.

The invention claimed is:

1. Method for producing a machine casing of a shredding device, comprising the steps of:
- providing component parts and/or assembly groups of the machine casing of the shredding device;
- providing retaining ring bolts, wherein the retaining bolts include helical securing grooves and retaining rings; and
- connecting at least some of the component parts and/or assembly groups of the machine casing to each other by means of the retaining ring bolts; wherein the connecting comprises
  - inserting a retaining bolt into a correspondingly prepared bore hole of a component part and/or assembly group,
  - rotating a retaining ring onto the bolt,
  - fitting a fixing tool to the helical securing grooves of the bolt and operating the fixing tool, whereby draw-in attachments of the tool partially draw the retaining bolt into the fixing tool and a deformation sleeve presses the retaining ring against the connection, thereby applying an initial clamping force,
  - compressing by the fixing tool the retaining ring so that the damping force is increased, and
  - releasing the fixing tool after the retaining ring is compressed,
  - thereby achieving a connection configured to withstand vibrations and forces produced by the shredding device.

2. The method according to claim 1, in which the shredding device is a single-shaft shredder.

3. The method according to claim 2, in which the shredding device is a single-shaft coarse shredder.

4. The method according to claim 1, in which at least some of the component parts and/or assembly groups of the machine casing, which are connected by means of the retaining ring bolts, comprise individual welding groups.

5. The method according to claim 1, in which the connection of the component parts and/or assembly groups by retaining ring bolts is accomplished by means of hydraulic mounting equipment.

6. The method according to claim 1, in which the at least some of the component parts and/or assembly groups are not connected to each other by means of the retaining ring bolts, but by welding.

7. The method according to claim 1, in which the shredding device is a multi-shaft shredder.

8. The method according to claim 1, in which the shredding device includes a rotor unit.

9. The method according to claim 1, in which the shredding device includes a pushing device.

10. The method of claim 1, wherein the component parts and/or assembly groups include at least one drive component.

11. The method according to claim 1, wherein the retaining ring bolts include alloyed carbon bolts.

12. The method according to claim 1, wherein the retaining ring bolts include zinc-plated retaining rings.

* * * * *